United States Patent [19]
Timpany

[11] Patent Number: 5,902,484
[45] Date of Patent: May 11, 1999

[54] METHOD AND SYSTEM FOR TREATMENT OF WATER AND WASTEWATER

[76] Inventor: Peter L. Timpany, Suite 300, 1122 - 4 Street S.W., Calgary, Alberta, Canada, T2R 1M1

[21] Appl. No.: 08/128,640

[22] Filed: Sep. 30, 1993

[51] Int. Cl.$^6$ .................................................... C02F 3/30
[52] U.S. Cl. ...................... 210/621; 210/629; 210/630; 210/921
[58] Field of Search .................... 210/605, 607, 210/620–626, 629, 630, 141–143, 921

[56] References Cited

U.S. PATENT DOCUMENTS

| | | | |
|---|---|---|---|
| 4,948,510 | 8/1990 | Todd et al. | 210/622 |
| 5,102,548 | 4/1992 | Baxter | 210/621 |
| 5,192,442 | 3/1993 | Piccirillo et al. | 210/622 |
| 5,213,681 | 5/1993 | Kos | 210/621 |
| 5,228,996 | 7/1993 | Lansdell | 210/621 |
| 5,354,471 | 10/1994 | Timpany et al. | 210/607 |

*Primary Examiner*—Thomas G. Wyse
*Attorney, Agent, or Firm*—Harold H. Dutton, Jr.

[57] ABSTRACT

Biological processes for treating wastewater include the conventional activated sludge process, which has continuous flow in and out of each treatment cell, and the sequencing batch reactor (SBR) process, which operates on a batch fill and draw basis. The first process operates at a constant level and requires the use of dedicated, relatively expensive external clarifiers to settle mixed liquor suspended solids and recycle activated sludge. The second process does not use separate clarifiers because treatment and settling of mixed liquor suspended solids is accomplished in a single basin, but has a variable level operation and resulting inefficient use of the treatment volume. This substantially constant level biological wastewater treatment process and system enables efficient treatment of wastewater, combining the advantages and eliminating the disadvantages of both SBR and activated sludge processes. In the present case, wastewater continuously flows in one direction through a plurality of treatment cells hydraulically connected in series. The wastewater is subjected to biological treatment in at least one of the cells and settled in at least one last treatment and discharge cell, immediately prior to discharge from the system.

3 Claims, 6 Drawing Sheets

METHOD AND SYSTEM FOR TREATMENT OF WATER AND WASTEWATER

BACKGROUND OF THE INVENTION

This invention relates to a method and a system for treatment of water and wastewater. More specifically, the method and system of the present invention are designed for the biological removal from wastewater of contamination in the form of solids and soluble organic material, and optionally the biological removal of nitrogen and phosphorus nutrients.

The biological treatment of sewage and other apparatuses for effecting such treatment are described in U.S. Pat. Nos. 2,907,463, issued to D. J. N. Light et al,. on Oct. 6, 1959; 3,964,998, issued to J. L. Bernard on Jun. 22, 1976; 4,279,753 issued to N. E. Nielson et al. on Jul. 21, 1981; 4,430,224 issued to U. Fuchs on Feb. 7, 1984; 4,468,327 issued to A. D. Brown on Aug. 28, 1984; 4,522,722 issued to E. M. Nicholas on Jun. 11, 1985; 4,663,044, issued to M. C. Goronszy on May 5, 1987; 4,798,673 issued to C. Huntington on Jan. 17, 1989; 4,867,883 issued to G. T. Daigger on Sep. 19, 1989; 4,948,510 issued to M. D. Todd et al. on Aug. 14, 1990; 5,013,441 issued to M. C. Goronszy on May 7, 1991; and in Canadian Patents Nos. 997,488, issued to B. K. Tholander et al. on Sep. 21, 1976 and 1,117,042, issued to M. L. Spector on Jan. 26, 1982.

In general, suspended growth activated sludge processes and modifications thereto have recently been shown to be able to accomplish the objectives set out above, but the costs of specialized clarifiers required to settle and recycle biological solids are quite high. Moreover, the size, complexity and operating problems encountered with such systems make them unattractive to many potential users. In addition, the basic activated sludge process often results in poor treatment because of the continuous flow through characteristics in the final clarifier and the resulting constant sludge management requirements.

As a consequence of the foregoing, during the past ten years improved final clarification and solids removal has been sought by using larger and improved but more complex and expensive designs for final clarifiers. Moreover, final effluent filtration is often necessary to reliably meet permitted environmental standards.

There has also been a recent revival of interest in the sequencing batch reactor (SBR) suspended growth activated sludge process because of the inherently more efficient batch settling and often higher treatment efficiency for batch organic contaminants removal than is possible with the conventional continuous flow activated sludge process. The SBR process uses the same vessel for batch aerated biological reaction and quiescent batch settling. Thus, the SBR process eliminates the major cost of dedicated final clarifiers necessary for the conventional activated sludge process as well as improving solids removal performance.

However the SBR process has several disadvantages, the principle one being that it does not operate with a constant level and continuous flow, but requires intermittent operation for cycles of fill, react, settle, decant and idle. Typical level fluctuations are 30% to 50% of the maximum operating depth or as much as 5 to 10 feet of level fluctuations. The result is a much lower use to total volume ratio than the conventional activated sludge process. Accordingly, the SBR process is generally not cost effective for flows greater than five to ten million gallons per day (MGD).

Another disadvantage of the SBR process is that significant head loss occurs from the influent to the final effluent, requiring additional energy and pumping costs. Additionally, because the effluent flow is not continuous, flow equalization systems may be required to prevent peak loadings and adverse impacts on receiving waters.

Finally, the basic process and design limitations of the SBR process make it difficult to achieve the same high efficiency biological nutrient removal possible using the continuous flow activated sludge process, especially for weak or colder wastewaters.

Several improvements have been attempted to overcome the limitations of the conventional SBR process. A continuous inflow, partitioned SBR process U.S. Pat. No. 4,468,327 was issued to A. D. Brown on Aug. 28, 1984, and cyclically operated intermittent flow path sequencial cycle, multi-zoned recycle SBR process U.S. Pat. Nos. 4,663,044 and 5,013,441 were issued to H. G. Goronszy on May 5, 1987 and May 7, 1991 respectively. Significant level fluctuations, head losses and intermittent high flow rate discharges, however, still prevent these processes from overcoming all the limitations of the conventional SBR process.

Attempts have also been made over the years to overcome the level variation limitations of all SBR type processes and the cost of dedicated final clarifiers for the conventional activated sludge process. The Degremont S.A. U.S. Pat. No. 3,470,092 issued to J. J. P. Bernard on Sep. 30, 1969 illustrates a first attempt to develop a new suspended growth activated sludge process utilizing the concepts of both batch treatment and continuous flow. This two cell process was partially interconnected at the water surface. The alternate cell feed concept was not effective because it did not achieve a high treatment efficiency, had a low aerator utilization factor, and required long detention times to operate, resulting in expensive systems. Union Carbide U.S. Pat. No. 4,179,366 issued to J. R. Kaelin on Dec. 18, 1979 added a third bottom interconnected cell, but also suffered from low treatment efficiency and ineffective changeover of untreated wastewater from the first cell to the third cell. The processes disclosed by both patents also required significant level fluctuations in the treatment cells between operating cycles which made it difficult to control flows and operate fixed, level-sensitive mechanical aeration systems.

Linde AG German Patent No. 3,147,920 issued on Oct. 13, 1983 utilized the same three cell concept as U.S. Pat. No. 4,179,366. Although this three cell process achieved a more constant level, and overcame some of the limitations of the prior art, the process failed because it relied on expensive and unreliable mechanical gates to separate the treatment cells at various cycle times, and because treatment efficiency and effectiveness was too low to be commercially useful.

VOR SA French Patent No. 2550522 issued on Feb. 15, 1985 describes another constant level apparatus including three separate, identical basins. This process required a large, expensive treatment system because three independent basins were required, only ⅓ of the total treatment volume was used for biological treatment at any time, and only ⅓ of the aeration equipment could be used at one time.

In spite of these attempts to improve on the performance and effectiveness of the SBR and conventional activated sludge processes, they do not provide a higher treatment efficiency and hence they are not significantly more cost effective. Such attempts have either failed to totally achieve the desired benefits, or have new inherent disadvantages which result in little or no net benefits compared to conventional methods.

All these attempts to develop constant level processes to improve on the conventional suspended growth activated sludge process, rely on the management control and recycle of mixed liquor suspended solids by back flushing or forward flushing through or around the treatment system by control of the timing and direction of wastewater flow into and through the treatment system. These methods of solids management differ significantly from variable level SBR's, and also differ from the constant level conventional activated sludge process, which settles the mixed liquor suspended solids in a dedicated final clarifier to collect and recycle the resulting activated sludge back to the aeration basin.

In contrast, this present invention relies on biological solids management by a novel substantially constant level wastewater treatment method and system in which mixed liquor suspended solids are positively transferred alternatively from at least one last treatment discharge cells to a previous hydraulically connected treatment cell simultaneously with the co-mingled partially treated wastewater, while being subjected to mixing prior to each last cell sequentially functioning once again as a quiescent clarifier for discharge of final treated effluent.

This novel treatment method and system makes it possible to achieve many worthwhile objectives to significantly increase the usefulness and lower the cost of wastewater treatment.

THE OBJECTS OF THE INVENTION

The principal object of the present invention similar to the objective of applicant's co-pending U.S. patent application Ser. No. 07963,478, filed Oct. 19, 1992, is to provide a method and a system which maintains the benefits of the sequencing batch reactor (SBR) process while eliminating its disadvantages.

Another object of the invention is to eliminate the disadvantages of prior art attempts to improve on SBR and conventional activated sludge processes by achieving greater utilization and effectiveness of aeration systems, maintaining a constant level or requiring only small hydraulic level changes, and thus increasing the oxygen transfer efficiency of the aeration systems, and not exceeding aeration power per unit volume limitations as it is common with some process designs to date, making possible use of a fixed level discharge weir flow control systems and continuous flow in, through, and out of a treatment system at all times.

Another object of the invention is to provide a process that is capable of achieving a high treatment efficiency and a system which is simple to design, construct, operate and maintain, while being more cost effective than either SBR or conventional activated sludge processes for either small or large flows up to 100 MGD or greater.

Another object of the invention is to provide a low cost method and a treatment system facilitating biological nitrogen and/or phosphorus nutrient removal even for weak (e.g. dilute) or colder wastewaters as is possible, but at high cost, by use of advanced nutrient removal activated sludge processes.

Another object of the invention is the use of a single basin for treatment to eliminate the inefficient land use, costs, and complexity of treating wastewaters in a plurality of separate hydraulic structures as required by SBR and conventional activated sludge processes to date.

Another object of the invention is to make possible a low cost modification of existing aerated basins or lagoons to convert them to a higher treatment efficiency activated sludge process style of treatment, either by use of "on-the-run" modifications or by simple expansion of the aerated basins or lagoons.

Yet another object of the invention is to be able to operate at low or high food to micro-organism ratios and at low to high hydraulic retention times, depending on the sludge age and resulting waste sludge production rate selected by a designer, as well as being able to operate for a specific system with low food to micro organism ratio variations and hence making possible optimized system process operations and minimum treated effluent variations.

A final object of the invention is to make possible the use of a single dedicated inlet location for introducing untreated wastewater into the treatment system like the conventional activated sludge process and to eliminate the operating complexity and cost of multiple controls and facilities needed to direct untreated wastewater to different treatment cells or hold back flows within the system at different time periods as is common with SBR type processes.

SUMMARY OF THE INVENTION

In accordance with one aspect, the invention relates to a method of biologically treating wastewater by a modified activated sludge process comprising the following steps: feeding the wastewater at a dedicated single inlet position to a first treatment cell so the wastewater flows in the same direction through a plurality of treatment cells hydraulically connected in series; subjecting the wastewater to aeration mixing and biological treatment in at least one cell; settling the mixed liquor suspended solids in the wastewater and discharge of treated wastewater from at least one (last) treatment discharge cell while the aeration mixing means is turned off so that the settled mixed liquor suspended solids remains in the treatment system; transferring mixed liquor suspended solids and co-mingled partially treated wastewater back to at least one previous cell to provide biological treatment therein while the discharge from the treatment discharge cell is closed and the aeration mixing means therein is turned on to re-suspend the settled mixed liquor suspended solids; and at the completion of the solids transfer step recommencing discharge of treated wastewater from the (last) discharge cell after final (batch) wastewater polishing treatment by aeration mixing and pre-settling of mixed liquor suspended solids has been completed. The method includes recycle of partially treated wastewater and biological solids contained in the mixed liquor suspended solids and a method of controlling the schedule of treated wastewater being discharged from the system in a fixed pattern selected to achieve the treatment objectives. Achieving a substantially constant water level is possible by using only one last cell for long hydraulic retention time systems. A method of achieving a substantially constant level of operation with the invention for even short hydraulic retention time systems includes controlling the flow out of two (last) treatment discharge cells, both of which are hydraulically connected to the first cell, so that they discharge alternatively.

In accordance with a second aspect, the invention relates to a system for biological treatment of wastewater comprising at least two cells or zones in a basin wherein one (first) cell is a feed cell provided with inlet means for introducing untreated wastewater; all cells are hydraulically connected in series from the feed cell to the discharge cell(s), and are typically provided with aeration mixing means so biological treatment and mixing can be provided to the wastewater in all cells; at least one (last) treatment discharge cell is provided with on-off control means for its aeration mixing means, outlet flow control means for discharging treated wastewater out of the treatment system after the aeration mixing means is shut off to allow pre-settling of mixed liquor suspended solids, and a transfer means to transfer mixed liquor suspended solids and partially treated wastewater back to a prior treatment cell while said aeration mixing means is turned on; and the entire treatment system may be operated automatically by providing a central flow control means to direct the flow through and out of the treatment basin and to control the on-off schedule for said aeration mixing means, said discharge flow control means and said transfer means to transfer mixed liquor suspended solids and partially treated wastewater back to the previous cell. Two or more last cells are provided for short hydraulic retention time systems in order to achieve substantially constant level operation.

BRIEF DESCRIPTION OF THE DRAWINGS

The invention will be described in greater detail, with reference to the accompanying figures, which illustrate preferred embodiments of the system of the present invention, and wherein.

DESCRIPTION OF THE PREFERRED EMBODIMENTS

Figure 1A:
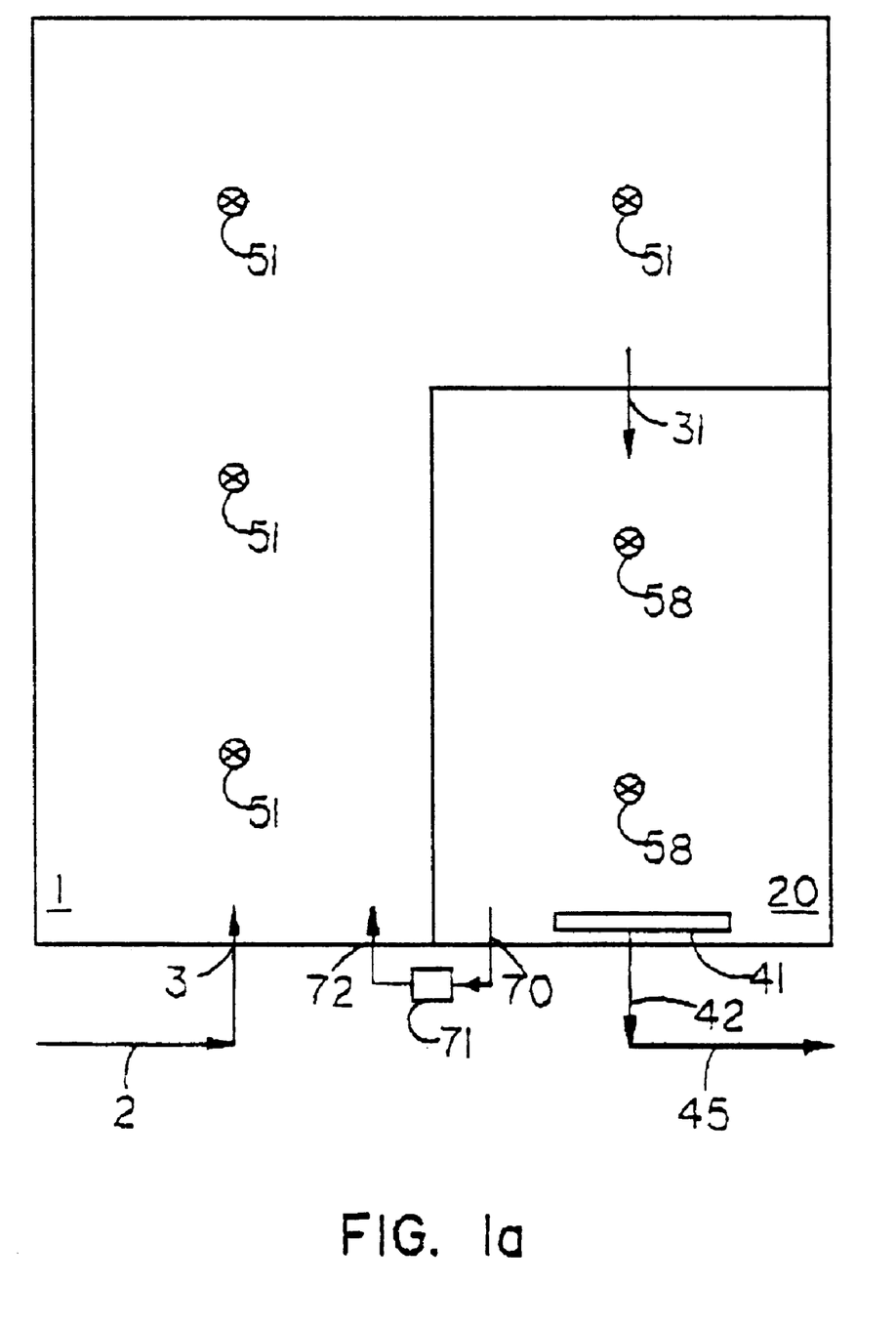
FIG. 1a is a schematic flow diagram of a two cell long hydraulic retention time system for providing biological treatment of wastewater solids and soluble organic material in accordance with the present invention.

Referring to FIG. 1a, the most basic embodiment of the present invention includes two cells or zones in one basin capable of receiving constant inflow and maintaining a substantially constant operating level for long hydraulic retention time systems. The untreated wastewater may be continuously introduced into Cell 1 via inlet pipe 2 at inlet 3 and flow continually out of Cell 1 through free hydraulic connections at 31 to treatment discharge cell 20. The treatment discharge cell 20 is hydraulically and may be always unhinderedly and freely connected to cell 1 at 31. Cell 20 also is preferably less than one-half and typically 25–40% or less of the volume of the total treatment system. To obtain the most effective operation of cell 20, the hydraulic connection 31 may be multiple openings or an opening across the entire width of cell 20 near the top or bottom water level as used in conventional clarifier influent distribution systems. Similarly, discharge flow control means 31 would optimally remove treated wastewater across the entire width of cell 20. The treated wastewater is discharged on a continuing basis through flow control means 41 via outlet pipe 42 except for brief solids transfer and settling periods as discussed below. Flow control means 41 can be provided by flow control weir means as disclosed in applicant's co-pending U.S. patent application Ser. No. 07963,479, filed Oct. 19, 1992, fixed level weirs and commercially available discharge flow control means or conventional control valves connected to discharge pipe 42. Because the invention operates at a substantially constant level the use of conventional fixed level weirs and flow control valves can be utilized, which reduces the capital cost and improves operations by requiring less moving equipment than necessary for variable level SBR decanters. The aeration mixing means 51 in cell 1 typically supplies the majority of the oxygen and mixing necessary to achieve complete biological treatment of the wastewater by contact of the untreated wastewater with the mixed liquor suspended solids recycled from cell 20. The aeration mixing means 51 in cell 1 operates continuously which makes possible higher aerator utilization than possible with SBR systems. The aeration mixing means 58 in cell 20 is shut off during discharge of treated wastewater out of the system by outlet pipe 42. In order to achieve maximum wastewater treatment efficiency, the discharge out of cell 20 of partially treated wastewater received from cell 1 through 31 can be prevented by control of the length of time of discharge out of 41 and 45 so the lag time between the input and output of flow received in cell 20 is not exceeded. If lower treatment efficiency is acceptable, naturally said lag time can be exceeded as appropriate within the system operating limitations.

When the mixed liquor suspended solids from cell 1 accumulate by settling in cell 20 sufficiently to require removal, the following operating steps are used: the discharge flow control means 41 is closed for a short period and the aeration mixing means 58 turned on by the central control unit (not shown). A variety of commercially available, programmable logic controllers (PLC's) can be used to control all operating steps of the process similar to the control units used for conventional SBR processes.

After re-suspension of the mixed liquor suspended solids, a portion of the mixed liquor suspended solids in cell 20 and co-mingled partially treated wastewater are pumped through pipe 70 by solids transfer pump 71 back to cell 1 at inlet 72. This partial solids transfer ensures continuing high biological solids in cell 1 and sufficient biological solids remaining in cell 20 for additional polishing of partially treated wastewater transferred into cell 20 from cell 1 prior to once again discharging treated wastewater out of cell 20 by opening flow control means 41. The rate and duration of flow by transfer pump 71 is also selected to ensure that the accumulation of mixed liquor suspended solids in cell 20 is not too high to prevent effective treatment and settling of solids in cell 20 during subsequent treatment cycles and to achieve a substantially constant water level as discussed below. An essential part of this step of the process is the mixing accomplished by aeration mixing means 58. It is noted that for some applications with low oxygen demand in the final cell 20, the use of just mixing means in cell 20 is possible (e.g. aeration may be eliminated and just mixing means used to resuspend the mixed liquor suspended solids).

When sufficient mixed liquor suspended solids have been transferred out of cell 20 back to cell 1, solids transfer pump 71 is shut off by the central control unit, and aeration mixing means 58 remains on for a brief period if required to provide final batch polishing treatment for the partially treated wastewater in cell 20. At the completion of this final polishing treatment step in cell 20, the aeration mixing means 58 is shut off by the control unit, and cell 20 mixed liquor suspended solids are provided a predetermined pre-settling time prior to reopening of flow control means 41 and treated wastewater once again is discharged on a continuing basis out of the treatment system via 42.

The above operating steps are repeated in recurring cycles to provide continuous wastewater treatment as directed by the central control unit at regular time or flow volume intervals or when biological solids from cell 1 have accumulated sufficiently in cell 20 to require removal by transfer back to cell 1.

The means to achieve a substantially constant level operation and minimize the head loss of wastewater flowing through the system for this embodiment is to use a high rate of solids transfer and flow through pump 71 so the duration of zero discharge through flow control means 41 is minimized. Typical transfer flow rates would be 3 to 6 or more times the average flow into the treatment system and discharge out of 41 would occur typically 70–80% of the time for this embodiment.

Achieving a substantially constant operating level for FIG. 1a embodiment of the invention is most effective for long hydraulic retention time systems. Level variations of less than 1 foot are desirable, and preferably less than 3–6 inches and optimally less than 1–2 inches in order to achieve the most efficient oxygen transfer rates, effective use of fixed mounted aerators and also mixed liquor suspended solids settling in the last cell during the long treated wastewater discharge periods of up to 90% of the time each day. Substantially, constant operating levels are possible compared with typically 5–10 feet for SBR processes. However, for relatively short hydraulic retention time systems, e.g. retention times of less than approximately 24 hours, substantially constant level operation is not easily achieved by the basic embodiment of the invention as illustrated in FIG. 1a.

Figure 1B:
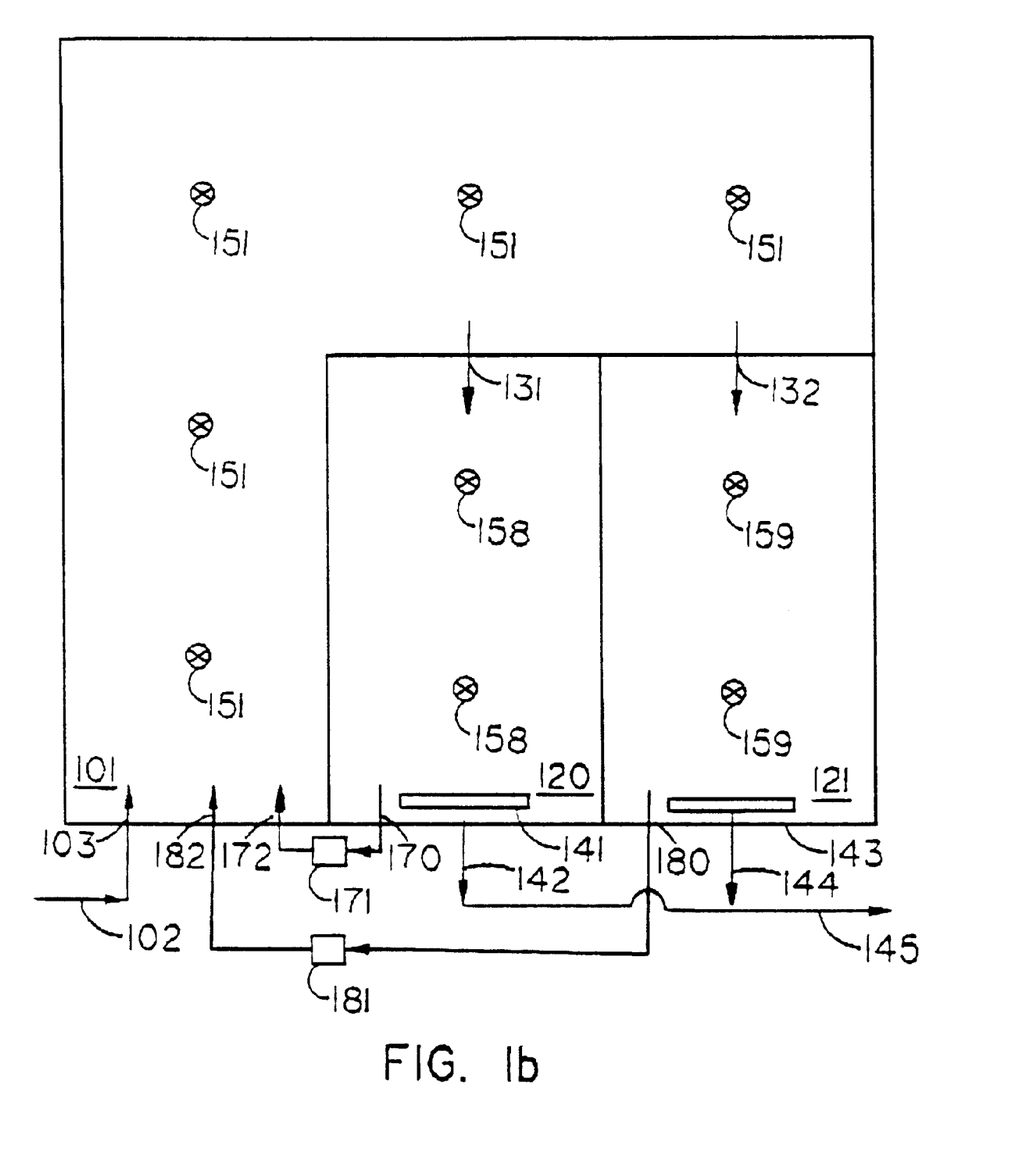
FIG. 1b is a schematic flow diagram of a three cell system for long or short hydraulic retention times to provide biological treatment of wastewater solids and soluble organic material in accordance with the present invention.

The means to essentially eliminate significant operating level fluctuations for any hydraulic retention time and also virtually eliminate the head loss of wastewater passing through the treatment system is to use a second treatment discharge cell as shown in FIG. 1b with a similar hydraulic connection means 131 and 132 to the treatment discharge cells 120 and 121 respectively, as for cell 20 connection to cell 1 at 31 in FIG. 1a. FIG. 1b has similar aeration mixing, solids transfer and discharge flow control means as for the embodiment of FIG. 1a. The second treatment discharge cell 121 operates with solids transfer at 180 through pump 181 and discharge to cell 101 at 182, and has identical operating steps as used for cell 20 in FIG. 1a, except said second treatment discharge cell 121 discharges treated effluent through flow control means 141. The result of this second preferred embodiment is a continuous flow into the system inlet 102 and essentially equal flow out of the total treatment system through outlet 145 at all times for long or short hydraulic retention time systems. Another benefit of this embodiment is by use of two lower flow rate transfer pumps 171, 181 working alternately from the two last cells 120, 121, respectively, the rate of transfer of biological solids back to the previous cell 101 would be more consistent and hence the food to microorganism ratio in prior cells 101 would also be more consistent. In combination these two factors result in a more controlled process unlike SBR variable process conditions and thus makes possible optimized treatment system design, operation, and consistently high treatment efficiency.

Figure 3:
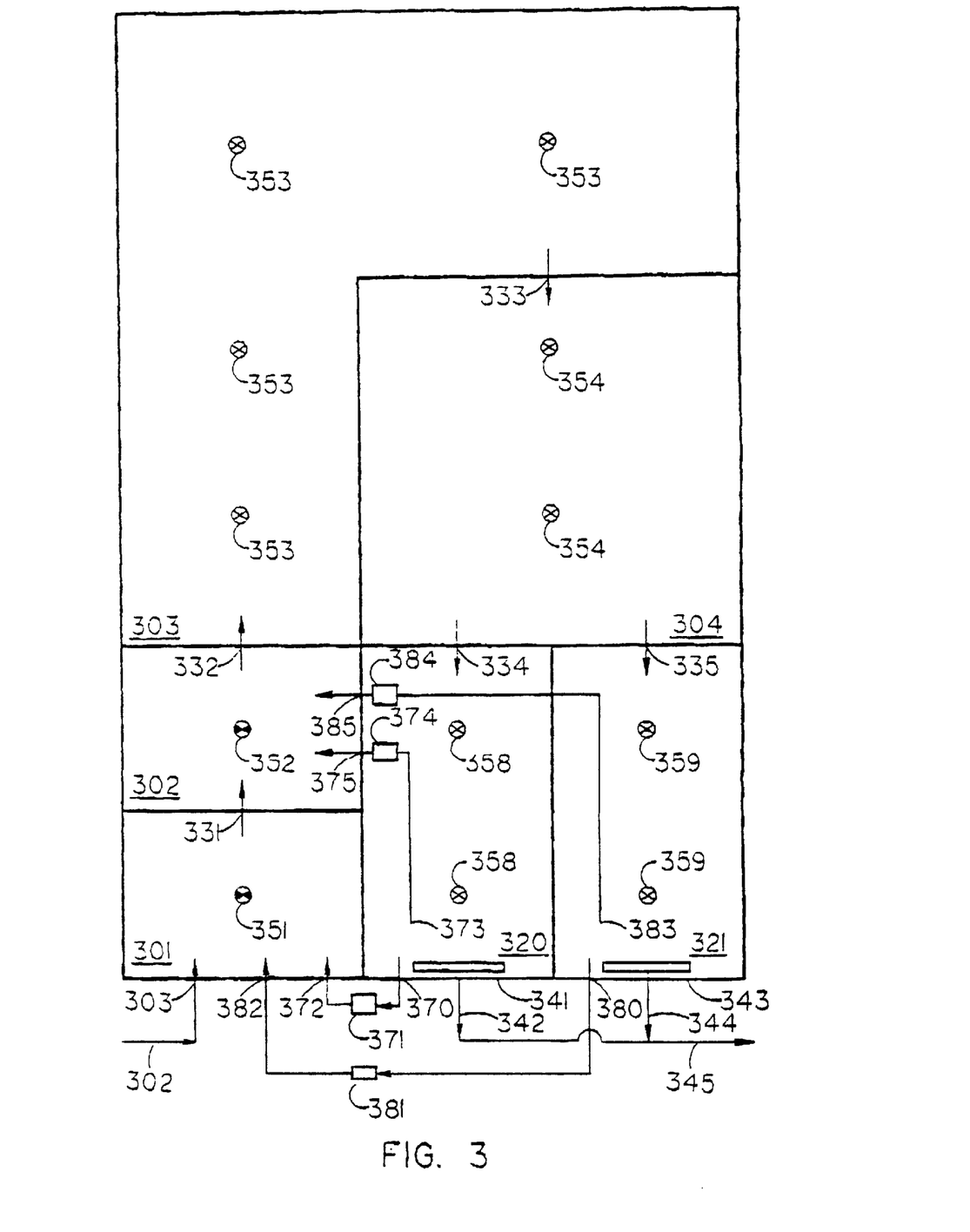
FIG. 3 is a schematic flow diagram of a six cell system suitable for also providing nitrogen removal in accordance with the present invention.
Figure 4:
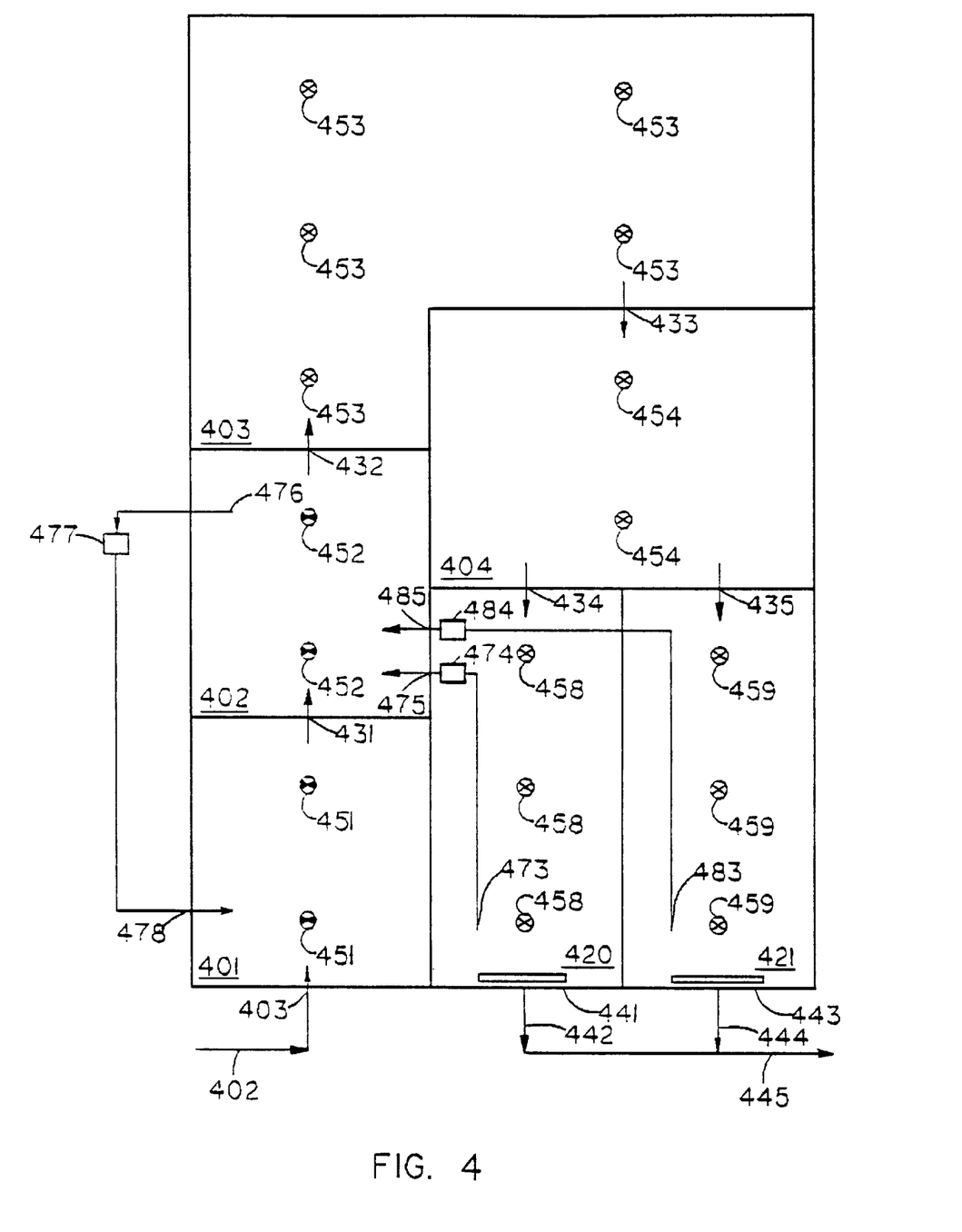
FIG. 4 is a schematic flow diagram of a six cell system suitable for also providing biological phosphorus as well as nitrogen removal in accordance with the present invention.

All other operations means of FIG. 1b system and operating methods used are similar to the equivalent means and system methods of FIG. 1a. Each equivalent means of operation is designated by the same number as that used in FIG. 1a plus 100 i.e. 2 is 102, 3 is 103 etc. Similarly, for the subsequent FIG. 2, 2 is 202, 3 is 203, etc., and for FIG. 3, 2 is 302, 203 is 303, etc. and for FIG. 4, 2 is 402, and 3 is 403, etc.

Figure 1C:
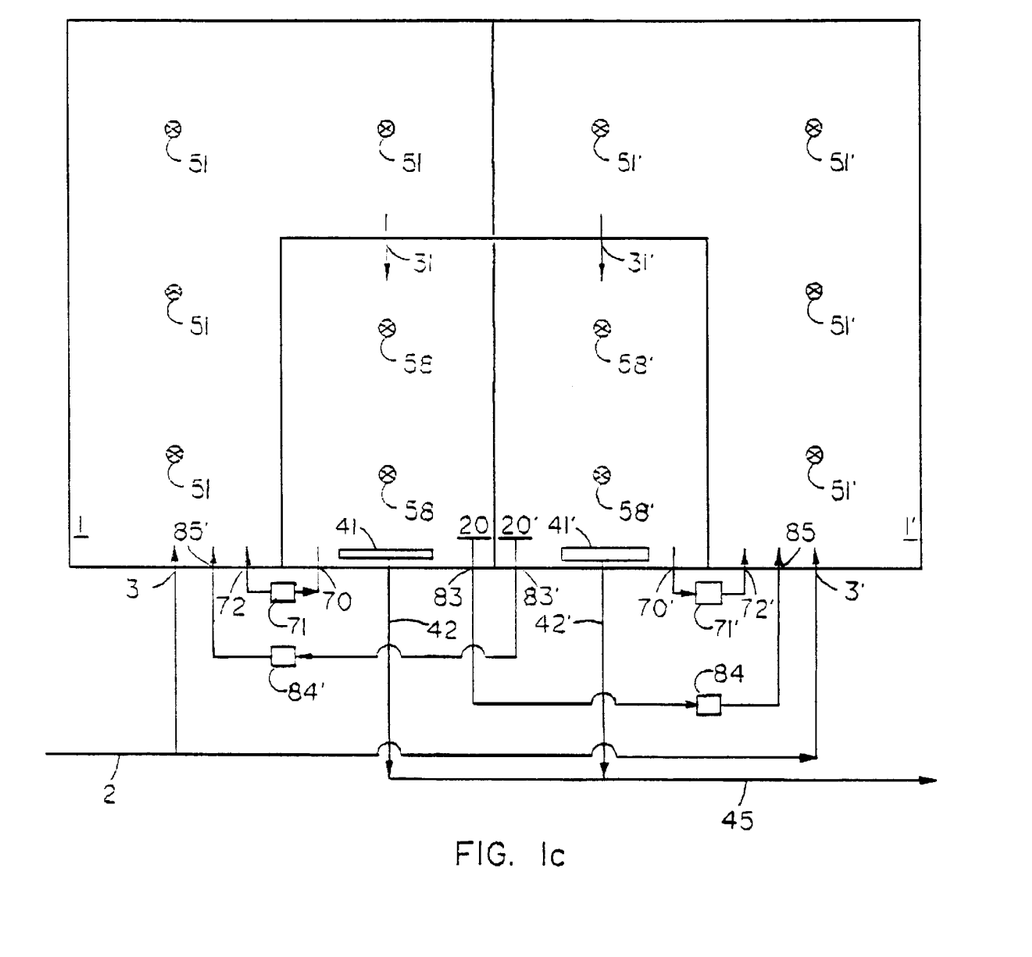
FIG. 1c is a schematic flow diagram of a four cell system with two mirror image FIG. 1a embodiments operating on an integrated basis in accordance with the present invention.

Continuous discharge and constant operating level can also be achieved for long or short hydraulic detention time systems by using two (or more) identical FIG. 1a complete systems operating in parallel, as shown in FIG. 1c. The treatment system means in FIG. 1c mirror image of FIG. 1a embodiment are designated as cell 1', as for cell 1 in FIG. 1a, aeration mixing means 58' as for 58 in FIG. 1a cell 1, aeration mixing means 58 respectively and so on, for those components performing the same functions. The result of this third preferred embodiment is that each side of the system would operate with no flow out of one of the treatment discharge cells 20 or 20' during operation of the other parallel system's treatment discharge cell 20', 20, respectively. To obtain maximum utilization of the aeration mixing means of this third preferred embodiment, untreated wastewater may be introduced constantly into each first cell and the solids may be transferred at least in part, from the last cells 20 and 20' to feed cells 1' and 1 respectively, through recycle system 83, 84, 85 and recycle system 83', 84', 85', respectively, instead of only to the feed cells hydraulically connected in series to each discharge cell. Alternatively, a common wall valved hydraulic connection (not shown) between cell 1 and cell 1' can be used to maintain a constant untreated wastewater flow into cells 1 and 1'. This third embodiment also has the benefit of facilitating the operation of one parallel system independently during inspection or maintenance down time on the other parallel system. Using parallel systems would also make it possible to control the flow through the identical parallel embodiments of the invention by use of flow control means on the influent to each system instead of controlling the flow out of each system. This flow control method is suited for certain applications, however, has reduced aerator utilization factors and less precise discharge timing as a result of slowly reducing flows out of discharge cells after the influent flow is diverted.

Another use of the invention which would be capable of continuous flow and constant operating level would be to utilize at least two large, equal sized treatment discharge cells, operated identically as cells 120 and 121 above, and to feed untreated wastewater into a very small common hydraulically connected first feed cell. Such a use of the invention would not be most cost effective, however, because of the inefficiencies of utilizing only about 50% of the aeration mixing means at one time. Such inefficiencies could be largely eliminated, however, by use of say 4 or more equal sized treatment discharge cells each used alternatively like cells 120 and 121, resulting in approximately 75% or more aeration mixing means utilization at one time.

Figure 2:
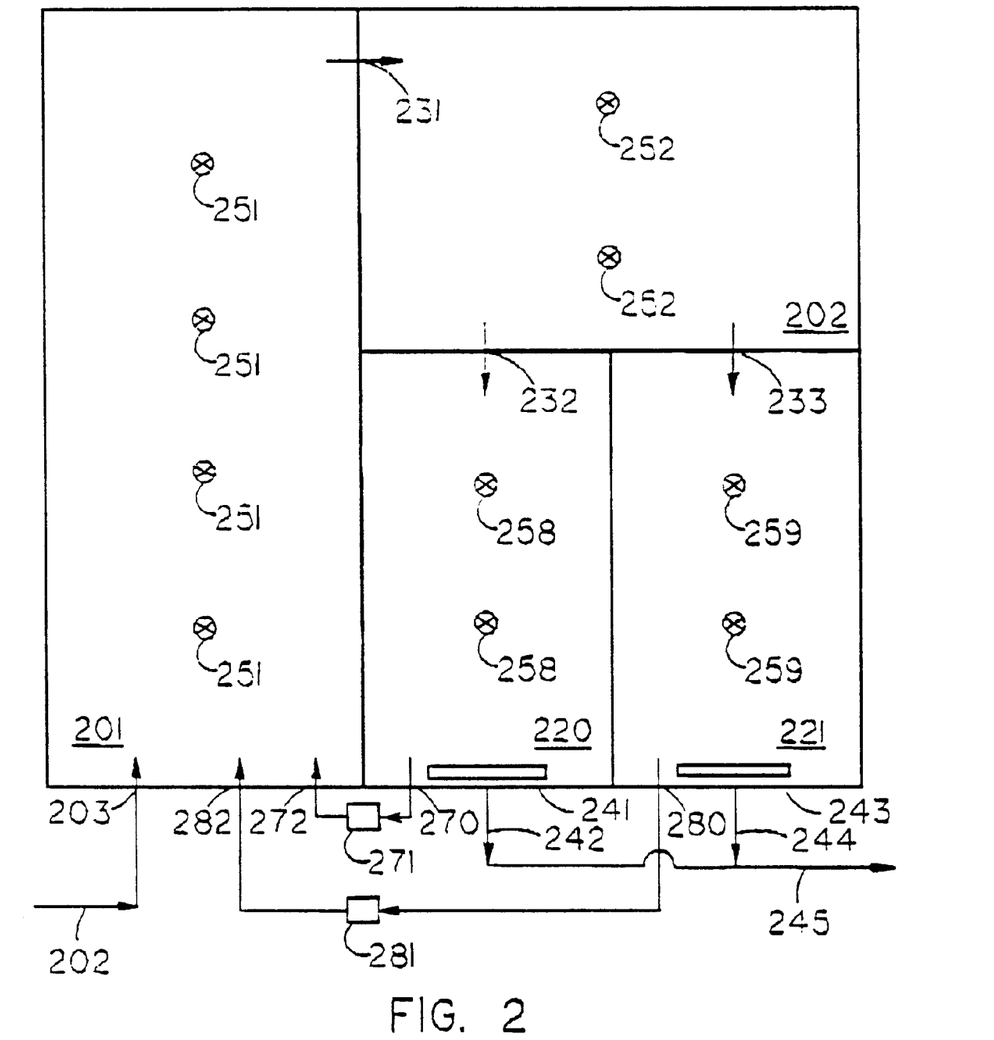
FIG. 2 is a schematic flow diagram of a four cell system for providing higher treatment efficiency for difficult to treat wastewater in accordance with the present invention.

The system illustrated in FIG. 2 is similar to the system of FIG. 1b, except that two cells 201 and 202 are provided with continuously operating aeration mixing means 251 and 252 respectively and have hydraulic connection means 231, 232 and 233 to allow wastewater to flow unhindered through the system to the (last) treatment discharge cells 220 and 221. This configuration of the invention makes possible similar operation as that illustrated in FIG. 1b but provides for a higher degree of treatment efficiency by improved plug flow characteristics if necessary based on specific wastewater characteristics and treatment objectives. If even higher degrees of treatment efficiency are required and even further plug flow characteristics would be helpful, several additional treatment cells can be provided in series with cells 201 and 202.

The system illustrated in FIG. 3 provides for removal of soluble and particulate contaminants but also makes possible high efficiency nitrogen removal by adapting conventional activated sludge nitrogen removal process concepts to achieve the specific additional benefits available by use of this invention. The principles of operation of this embodiment are similar to those illustrated in FIG. 1b and FIG. 2, except that transfer of mixed liquor suspended solids and co-mingled partially treated nitrified wastewater from cell 320 back to prior treatment cells can be provided with preferably two solids transfer pumps. The 371 and 374 transfer pumps in FIG. 3 transfer mixed liquor suspended solids and co-mingled partially treated wastewater in whatever ratio is required from cell 320 back to the first two cells 301 and 302 respectively, wherein the aeration means is turned off or reduced as required for the aeration mixing means 351 and 342 respectively. The resulting mixing means 351 and 352 thus provide little if any dissolved oxygen thus achieving anoxic conditions of typically not more than 0.5 mg/l of dissolved oxygen making possible biological dentrification of the wastewater in treatment cells 301 and 302 respectively. Alternatively, separate aeration means and mixing means can be provided in both these cells and used separately as required to achieve mixing and the dissolved oxygen concentration as required from time to time for optimized process operations. A lower degree of dentrification and process control can be achieved by eliminating recycle solids transfer pump 374 and/or treatment cell 302. Likewise for certain high nitrogen wastewaters, and for the requirement of higher degree of treatment efficiency, additional dentrification cells may be added beyond the two cells 301 and 302, and the aeration means and mixing means in subsequent treatment cells may be operated sequentially for improved dentrification.

As for previous embodiments of the invention, a constant operating level and essentially zero head loss and constant inlet flow at 302 and outlet flow at 345 can be achieved as shown in FIG. 3 embodiment by providing a second (last) treatment discharge cell 321 in addition to cell 320 and operating in a similar manner as for FIG. 1b and FIG. 2 embodiments. A mirror image independently operated parallel system can also be used as in FIG. 1c embodiment above to achieve a fully constant operating level.

The system and operation of FIG. 4 embodiment is similar to FIG. 3 embodiment and operation except that FIG. 4 embodiment provides a preferred embodiment of the invention which also achieves biological removal of phosphorus in addition to the removal of nitrogen, and treatment of soluble and particulate contaminants. Advanced activated sludge biological phosphorus removal process technologies, such as the University of Cape Town (UCT) process or the Modified UCT (MUCT) process, utilize pre-treatment anaerobic contact cell(s) having a dissolved oxygen concentration of typically less than 0.1 mg/l, in series with anoxic dentrification cell(s) having a dissolved oxygen concentration of typically less than 0.5 mg/l prior to aerobic treatment, nitrification, settling of mixed liquor suspended solids in dedicated clarifiers and return of the activated sludge to the anoxic cell(s) and a recycle from anoxic cell(s) to the first anaerobic cell. This invention also can make improved, more cost effective use of these or other biological phosphorus removal technology concepts as illustrated in the FIG. 4 embodiment as follows: mixed liquor suspended solids transfer pump 474 recycles solids and co-mingled nitrified partially treated wastewater from cell 420 at 473 to achieve dentrification in anoxic cell 402, which is maintained at a dissolved oxygen concentration typically of less than 0.5 mg/l. Pump 477 provides for recycle of mixed liquor suspended solids and co-mingled dentrified partially treated wastewater from anoxic cell 402 at 476 to anaerobic cell 401 at 478 to optimize the operation of cell 401, which is maintained at dissolved oxygen concentrations of typically less than 0.1 mg/l. If greater treatment efficiency is required more cells can be used to increase the number of anaerobic, anoxic or even aerobic treatment cells as required. In addition selected cell aeration means and mixing means can be operated sequentially instead of continuously as required to improve the treatment efficiency of nutrient removal for all embodiments of the invention.

Similar to the embodiments of the invention shown in FIGS. 1b, 2 and 3, the system as shown in the FIG. 4 embodiment can achieve a fully constant operating level and essentially zero head loss through the treatment system by providing a second (last) treatment discharge cell 421 to operate alternatively to cell 420 when no discharge is occurring through outlet flow control device 441. Other alternatives can also be used to achieve these objectives as discussed above.

For all embodiments of the invention, the necessary removal or wasting of excess solids can be accomplished by pumping of mixed liquor suspended solids from an intermediate aerobic cell prior to the last cell(s) at a continuous rate as required to achieve the treatment system's desired sludge age. Alternatively, if pre-thickened settled sludge wasting is desired, intermittent wasting of excess solids can be achieved by pumping settled mixed liquor suspended solids from the (last) treatment discharge cell(s) during settling and solids accumulation steps utilizing conventional sludge collection systems.

The result of use of the solids transfer pump(s) and the hydraulic connection means between the cells of all embodiments of the invention is a dynamic biological solids inventory and wastewater flow pattern that circulates around and through each system, but the concentrations of solids and wastewater patterns can be predicted in advance using conventional mass balance and flow simulation methods. Using these methods in combination with conventional process kinetic models makes possible solids management and accurate design predictions of treatment efficiency for any pre-characterized wastewaters treatable with conventional activated sludge processes.

The net result of the present invention is a process and treatment system capable of achieving the most effective food to microorganism ratio ranges in all treatment cells, hence a consistently high treatment efficiency in a single basin, with a continuous flow single inlet, and constant or substantially constant discharge flow capabilities at typical medium operating depths of 10–30 feet. The system can productively utilize essentially all of the available land area and treatment system volume 100% of the time, maintaining the process treatment benefits and eliminate the disadvantages of both the SBR and the conventional activated sludge processes. Finally the invention can reduce the capital cost and simplify operations of conventional treatment systems by eliminating separate dedicated clarification systems for the conventional activated sludge process and variable level flow control decanters for SBRs. These objectives can be met while maintaining substantially constant operating level with virtually no significant hydraulic head loss through the system, which is not possible with SBR's or even conventional activated sludge systems because of secondary clarifier head losses.

The present invention also makes possible economical high efficiency biological removal of nutrients even for dilute or cool wastewaters. This often cannot be reliably achieved by SBR processes, which attempt to provide all treatment steps sequentially in one cell instead of using separate high efficiency dedicated anaerobic and anoxic cells with optimized recycles. The present invention also accomplishes high efficiency nutrient removal without the use of the extra large dedicated final clarifiers typically required for conventional high efficiency activated sludge nutrient removal process systems.

The present invention also makes possible the retrofit of existing aerated basins or lagoons to a higher treatment efficiency activated sludge style of treatment by making possible virtually no head loss through the system and installation of retrofit baffles "on-the-run" to create the treatment discharge cells as specified for this invention without the necessity of shutting down the existing aerated basins or lagoons.

Finally, the present invention has been shown to be capable of achieving higher aerator utilization ratios and diffuser oxygen transfer efficiency than possible with the SBR variable level process. Also possible are higher efficiency of aeration power use which does not exceed limiting power per unit volume factors. The system has been shown to be cost effective for low or high strength wastes, and for both small or large flows at low or high hydraulic retention times and low or high food to microorganism ratios.

Although the invention has been described as being intended for biological wastewater treatment systems, it will be appreciated that the invention could be used for other water or wastewater treatment applications such as chemical flocculation and settling or anaerobic removal of contaminants, e.g. the anaerobic contact process as well as other biological, chemical, or other processes requiring reaction or treatment contact time with mixing or aeration followed by gravity clarification of solids prior to recycle of solids and co-mingled treated or partially treated fluid during mixing of the final treatment cell to complete the process cycle. Having thus provided a general discussion, described the overall method and system in detail and illustrated the invention with typical examples and simple schematics of how to utilize the invention, it is now evident that effective solutions have been provided by the invention over operating and high cost problems of prior art. It is therefore to be understood that no undue restrictions are to be imposed by reason of the specific embodiments of the invention as illustrated and discussed herein.

What I claim is:

1. A method of treating water containing contaminants comprising the steps of:

providing first and second hydraulically connected treatment cells, said first treatment cell being a treatment inlet cell and said second treatment cell being a treatment discharge cell;

introducing untreated water into said first treatment cell;

causing the water to be treated to flow through said first and second cells;

maintaining the level of water in said treatment discharge cell at a substantially constant level;

treating the water in each of said treatment cells;

periodically mixing the water in said discharge cell for resuspending previously settled solids;

returning a portion of the water in said discharge cell back to said first cell during said periodic mixing step;

discharging treated water from said treatment discharge cell when said periodical mixing step is not being conducted; and providing a central control for regulating the performance of the previous steps.

2. A method of treating water containing contaminants as in claim 1, and including continuously introducing the water into said treatment inlet cell, and allowing uninterrupted flow of wastewater from said inlet cell to said discharge cell; and treating the water by aerating and mixing the water in said first cell for oxygenating and mixing liquor suspended solids in said first cell; periodically returning a portion of the water and mixed liquor suspended solids in each discharge cell to said first cell during the aerating and mixing of water therein.

3. A method as in claim 2 and including:

providing a second inlet treatment cell for receiving and treating untreated wastewater, continuously introducing untreated wastewater into said second inlet cell, allowing an uninterrupted flow of wastewater from said second inlet cell to said treatment discharge cell, and treating the wastewater in said second inlet cell by aerating and mixing the wastewater in said second inlet cell for oxygenating and mixing liquor suspended solids in said second inlet cell.

\* \* \* \* \*